United States Patent [19]

Sydansk

[11] Patent Number: 5,421,411
[45] Date of Patent: Jun. 6, 1995

[54] PROCESS FOR REDUCING PERMEABILITY IN A SUBTERRANEAN HYDROCARBON-BEARING FORMATION UTILIZING A GELATION SOLUTION HAVING A CONTROLLED GELATION RATE

[75] Inventor: Robert D. Sydansk, Littleton, Colo.

[73] Assignee: Marathon Oil Company, Findlay, Ohio

[21] Appl. No.: 176,737

[22] Filed: Jan. 3, 1994

[51] Int. Cl.⁶ .......................................... E21B 33/138
[52] U.S. Cl. .................................. 166/295; 166/300; 507/903; 523/130
[58] Field of Search ............... 166/270, 294, 295, 300; 523/130; 507/903

[56] References Cited

U.S. PATENT DOCUMENTS

| | | | |
|---|---|---|---|
| 3,762,476 | 10/1973 | Gall | 166/294 |
| 4,683,949 | 8/1987 | Sydansk et al. | 166/270 |
| 4,706,754 | 11/1987 | Smith | 166/295 |
| 4,770,245 | 9/1988 | Sydansk | 166/295 |
| 4,917,186 | 4/1990 | Mumallah | 166/295 |
| 5,069,281 | 12/1991 | Tackett, Jr. | 166/295 |
| 5,131,469 | 7/1992 | Lockhart et al. | 166/295 |
| 5,143,958 | 9/1992 | Lockhart et al. | 524/219 |
| 5,181,568 | 1/1993 | McKown et al. | 166/295 X |
| 5,219,475 | 6/1993 | Lockhart et al. | 252/8.551 |
| 5,219,476 | 6/1993 | Lockhart et al. | 252/8.551 |
| 5,338,465 | 8/1994 | Lockhart et al. | 166/295 X |

OTHER PUBLICATIONS

Lockhart et al., "A New Gelation Technology For In-Depth Placement of $Cr^{3+}$/Polymer Gels In High-Temperature Reservoirs," SPE/DOE 24194, Apr. 1992.

Lockhart et al., "Gelation-Delaying Additives For $Cr^{3+}$/Polymer Gels", SPE 25221, Mar. 1993.

Primary Examiner—George A. Suchfield
Attorney, Agent, or Firm—Jack L. Hummel; Jack E. Ebel

[57] ABSTRACT

A process and composition are provided for permeability reduction in a hydrocarbon-bearing formation to improve hydrocarbon recovery therefrom. The process includes placement of a crosslinked polymer gel in the treatment region preceded by surface preparation of a gelation solution which is the gel precursor. The gelation solution contains a crosslinkable polymer, a chromium(III)/carboxylate complex crosslinking agent, a carboxylate salt delaying agent and an aqueous solvent. The gel is placed in the treatment region by injecting the gelation solution into a well bore in fluid communication with the formation, displacing it into the desired treatment region and gelling the solution to completion forming the permeability-reducing gel in situ. The gelation rate is retarded in a controlled manner by adjusting the composition or concentration of the delaying agent in the gelation solution.

41 Claims, 1 Drawing Sheet

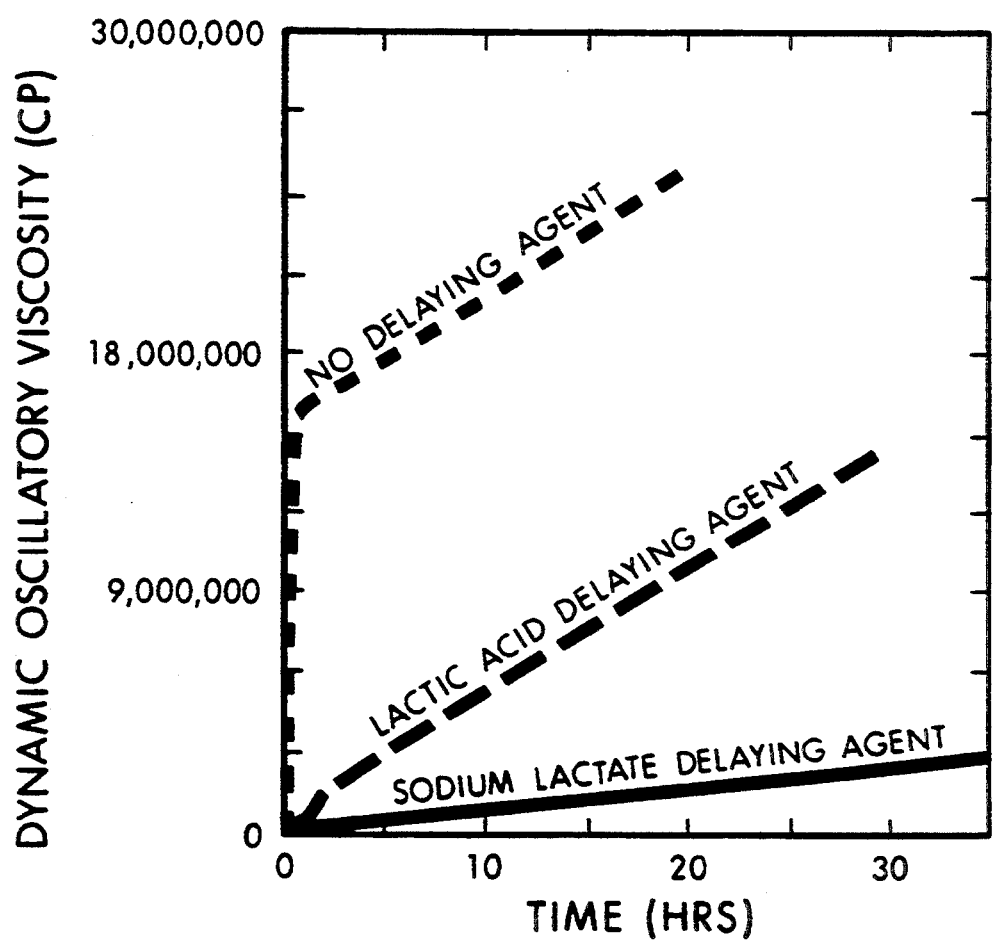

PROCESS FOR REDUCING PERMEABILITY IN A SUBTERRANEAN HYDROCARBON-BEARING FORMATION UTILIZING A GELATION SOLUTION HAVING A CONTROLLED GELATION RATE

BACKGROUND OF THE INVENTION

1. Technical Field

The invention relates to a process for recovering hydrocarbons from a subterranean formation, and more particularly to a hydrocarbon recovery process using a permeability-reducing agent.

2. Background Information

The utility of crosslinked polymer gels as a permeability-reducing agent in subterranean hydrocarbon-bearing formations to facilitate hydrocarbon recovery therefrom has long been known in the art. U.S. Pat. No. 3,762,476 to Gall is representative of conventional teaching in the art of its time. Gall discloses a conformance improvement treatment process, wherein a permeability-reducing crosslinked polymer gel is formed in situ by injecting an aqueous slug containing a crosslinkable water-soluble polymer into the subterranean treatment region followed in sequence by an aqueous slug containing a crosslinking agent made up of a polyvalent metal cation complexed with a retarding anion. Useful polyvalent metal cations listed in Gall include iron(II), iron(III), aluminum(III), chromium(III), calcium(II), and magnesium(II). Useful retarding anions complexed with the cation include citrate, phosphate, acetate, nitrilotriacetate, and tartrate.

Sequential injection of the gel components as separate and distinct slugs into the treatment region is essential to the teaching of treatment processes such as Gall insofar as surface contacting of the polymer and crosslinking agent was believed to cause premature gelation of the gel components prior to reaching the treatment region. If prematurely formed at the surface or in the well bore, placement in the treatment region of the gels taught by Gall was difficult, if not impossible, to achieve. Consequently, sequential injection of the gel components in concept avoided premature gelation by delaying contacting of the components until they were displaced out into the treatment region of the formation.

In situ contacting of the polymer and crosslinking agent as required by Gall, nevertheless, proved operationally unattractive in many hydrocarbon recovery applications because of the difficulty in achieving adequate mixing of the gel components in situ. Without adequate mixing, the gels of Gall were poorly formed, resulting in weak and unstable gels that performed ineffectively as permeability-reducing agents.

In the face of conventional teaching represented by Gall, U.S. Pat. No. 4,683,949 to Sydansk et al. identified specific gel components and gelation parameters for a crosslinked polymer gel having utility in a conformance improvement treatment process, whereby the polymer and crosslinking agent of the gel could be mixed at the surface in a homogeneous gelation solution and placed in the treatment region by injection therein as a single slug. Thus, Sydansk et al. overcame the inherent operational limitations of processes such as Gall that required sequential injection and in situ mixing of the gel components. Sydansk et al. was predicated on the finding that a chromium(III)/carboxylate complex crosslinking agent could be mixed with a crosslinkable polymer at the surface to form a gelation solution producing gels that were uniquely stable and had highly predictable gel strengths and gelation times, yet were capable of practical long-term placement in subterranean treatment regions, even in hostile environments. The process of Sydansk et al. successfully enabled formulation of gels having a broad range of physical characteristics for effective conformance improvement treatments under varying in situ conditions.

The teaching of Sydansk et al. has subsequently been adapted to certain specific, typically problematic, conformance improvement treatment applications. For example, in some high temperature or far well bore applications, it has been found that absent the addition of a supplemental delaying agent to the gelation solution, the chromium(III)/carboxylate complex taught by Sydansk et al. excessively crosslinks the polymer before the gelation solution reaches the desired treatment region, increasing the difficulty of placing the gel in the treatment region.

Accordingly, U.S. Pat. No. 4,706,754 to Smith addressed specific treatment applications, wherein longer gel times are advantageously provided. Smith discloses the addition of a supplemental delaying agent to a gelation solution containing a water-soluble crosslinkable polymer and a metal/carboxylate complex crosslinking agent. The supplemental delaying agent comprises excess carboxylate anions in the form of a carboxylic acid which delay gelation of the polymer and crosslinking agent, thereby facilitating heretofore problematic placement of the crosslinked gels in high temperature or remote treatment regions.

U.S. Pat. Nos. 5,131,469 and 5,143,958 to Lockhart et al. likewise teach gelation solutions containing a crosslinkable polymer, a crosslinking agent, and excess carboxylate anions in the form of a carboxylic acid that perform as a delaying agent. The Lockhart et al. patents, however, teach a crosslinking agent having a crosslinking metal cation in the form of a water-soluble inorganic chromium(III) salt, as distinguishable from Smith wherein the metal cation of the crosslinking agent is in the form of an organic metal/carboxylate complex. The Lockhart et al. patents are further distinguishable from Smith insofar as the Lockhart et al. patents expressly repudiate the utility of the acetate anion, either in a chromium(III) complex, in acetic acid or in an acetate salt, as a component of the gelation solutions taught therein.

Notwithstanding the teaching of the prior art represented by the Smith and Lockhart et al. patents, a gelation solution containing a crosslinkable polymer, a chromium(III)/carboxylate complex crosslinking agent, and a carboxylate delaying agent has been found with a controllable gel time to enable placement of the resulting gel in a wide range of subterranean treatment regions. Moreover, the present gelation solution obviates problems experienced by the prior art, wherein acidic gelation solutions are often corrosive when contacting surface or well bore equipment and tubing. The present gelation solution obviates another problem encountered with acidic gelation solutions, wherein certain polymers, otherwise useful in gelation solutions, tend to autohydrolyze in an acidic environment. Acid catalyzes the autohydrolysis reaction of the polymer, at times causing premature gelation of the gelation solution. Acidic gelation solutions can also react with the reservoir rock, particularly carbonates, acidizing the rock which causes loss of the acid component and which also causes complicated and undesirable side reactions with the rock. As such a need has existed for an effective gelation solution that is relatively noncorrosive to the oil field tubing and equipment, does not promote autohydrolysis of the polymer to be cross-linked, and is substantially unreactive with the reservoir rock, yet can be formulated with a sufficient gel time for placement in remote or high temperature treatment regions.

It is, therefore, an object of the present invention to provide a process forming a crosslinked polymer gel for permeability reduction in a subterranean hydrocarbon-bearing formation. It is also an object of the present invention to provide a gelation solution composition that forms such a crosslinked polymer gel. It is a further object of the present invention to retard the gelation rate of the gelation solution by supplementing the gelation solution with a delaying agent. It is another object of the present invention to control the degree of gelation rate retardation in a predictable and controllable manner by selectively increasing or decreasing the concentration of delaying agent in the gelation solution. It is another object of the present invention to control the degree of gelation rate retardation by selecting the ligand strength of the delaying agent relative to the ligand strength of the crosslinking agent. It is still another object of the present invention to provide such a gelation solution that is relatively noncorrosive to the oil field tubing and equipment. It is yet another object of the present invention to provide such a gelation solution that does not tend to induce autohydrolysis of the crosslinkable polymer contained therein. It is another object of the present invention to provide such a gelation solution that is substantially unreactive with the reservoir rock.

SUMMARY OF THE INVENTION

The present invention is a process and composition for improving hydrocarbon recovery from a subterranean hydrocarbon-bearing formation penetrated by a well bore. Improved hydrocarbon recovery is effectuated in accordance with the invention by employing a specific composition to reduce permeability within a desired treatment region of a subterranean formation penetrated by a fluid injection well bore or a hydrocarbon production well bore. Encompassed within the scope of the invention are conformance improvement treatment, coning treatment, fluid shutoff treatment, and squeeze cement treatment applications.

The permeability-reducing composition is used in a conformance improvement treatment to reduce the permeability of a high permeability region in the formation. The treatment particularly improves vertical and areal conformance within the formation and correspondingly improves flow profiles and sweep efficiencies of injected or produced fluids in the formation. The treatment can also prevent the diversion of injected fluids away from a hydrocarbon-producing zone into adjacent thief zones of or proximate to the formation.

The permeability-reducing composition is used in a coning treatment to selectively block the flow of unwanted fluids into a hydrocarbon-producing zone of the formation from a second proximate zone or formation, such as from an underlying aquifer. Alternatively, the coning treatment selectively blocks the flow of unwanted fluids into the hydrocarbon-producing zone from an overlying gas cap. Typically, the proximate zone or formation being partially or completely isolated from the hydrocarbon-producing zone contains producible, but unwanted, fluids such as water or gas. The coning treatment prevents or reduces intrusion of the unwanted fluids into the hydrocarbon producing zone under a water or gas coning mechanism.

The permeability-reducing composition is used in a squeeze cement treatment to shut off and abandon a zone of the formation in direct communication with the well bore penetrating the formation or to shut off a volume proximate to the well bore. Squeeze cementing enables essentially total fluid shutoff of the abandoned zone or proximate volume so that the well bore can be recompleted or reconfigured for more effective post-treatment utilization. The permeability-reducing composition can also be used in a squeeze cement treatment to remediate small well bore leaks by shutting off small openings or annuli in or along the well bore.

The permeability-reducing composition is used in a fluid shutoff treatment to reduce the undesirable flow of a liquid or a gas within a formation. Oftentimes the fluid shutoff treatment is used to reduce the undersirable entry of water or gas into a well bore. In some cases the fluid shutoff treatment is employed in production well bores to reduce the volume of water entering the well bore via channeling. Fluid shutoff treatments may be particularly directed to reducing the flow of fluids from the injection well bore into the production well bore.

The present process, in each of its above-recited applications, requires placement of a crosslinked polymer gel in a desired treatment region of the formation to act as a permeability-reducing agent therein. Placement of the gel is preceded by preparation of a gelation solution at the surface which is a precursor to the gel. The gelation solution contains a crosslinkable polymer, a chromium(III)/carboxylate complex crosslinking agent, a carboxylate salt delaying agent and an aqueous solvent. In a further embodiment, the present invention is the composition of the above-recited gelation solution.

The gel is placed in the desired treatment region by injecting the gelation solution as a homogeneous slug into a well bore in fluid communication with the hydrocarbon-bearing formation. The gelation solution is displaced into the desired treatment region and gelled to completion forming a permeability-reducing gel therein. The gelation rate is controlled by selecting the concentration and species of carboxylate salt in the gelation solution in accordance with the depth and temperature of the desired treatment region. The salt provides an excess of carboxylate anions in the gelation solution which retards the gelation rate as a function of the salt concentration and salt species, thereby delaying complete gelation of the gelation solution until it reaches the treatment region.

BRIEF DESCRIPTION OF THE DRAWING

FIG. 1 is a graph illustrating the gelation rate retarding performance of a sodium lactate delaying agent as used in accordance with the present invention in comparison to the gelation rate retarding performance of a lactic acid delaying agent as taught by the prior art.

DESCRIPTION OF PREFERRED EMBODIMENTS

A number of specific terms are used throughout the specification to describe the process of the present invention and are defined as follows. A "subterranean hydrocarbon-bearing formation" is a subterranean geological structure consisting essentially of "matrix," and in some instances, "anomalies." The term "subterranean hydrocarbon-bearing formation" is synonymous with the term "reservoir." An "anomaly" is a volume within a formation having very high permeability relative to the matrix. The term "anomaly" is inclusive of such highly permeable volumes as fractures, fracture networks, joints, cracks, fissures, vugs, voids, solution channels, caverns, washouts, cavities, and the like. The "matrix" is generally characterized as substantially continuous, sedimentary geological material having a very low permeability relative to an anomaly. In addition, the matrix is often characterized as competent.

The term "well bore" is defined as a bore hole extending from the earth surface to the subterranean hydrocarbon-bearing formation. Thus, a well bore is a conduit providing fluid communication between the surface and the subterranean hydrocarbon-bearing formation penetrated thereby. A production well bore enables the removal of fluids from the subterranean hydrocarbon-bearing formation to the surface and an injection well bore enables the placement of fluids into the subterranean hydrocarbon-bearing formation from the surface. It is noted that a given well bore can function interchangeably as a production well bore or an injection well bore depending on whether a fluid is being removed from or placed in the well bore. The term "well" is synonymous with the term "well bore." Other terms used herein have definitions in accordance with the conventional usage of a skilled artisan, unless otherwise defined hereafter.

The process of the present invention comprises preparing a flowing liquid gelation solution at the earthen surface, injecting the gelation solution into a well bore in fluid communication with a subterranean hydrocarbon-bearing formation, displacing the gelation solution into a desired treatment region of the formation and gelling the solution in situ, thereby placing a permeability-reducing gel in the treatment region. As such, the gelation solution is a gel precursor that is transformable from a solution to a gel after being aged to maturity for a predetermined gel time. A "gel" is defined herein as a continuous three-dimensional crosslinked polymeric network integrating a liquid into the interstices of the network.

The gelation solution comprises a crosslinkable polymer, a crosslinking agent, and a delaying agent in solution within an aqueous solvent. Crosslinkable polymers are well known in the art and any such water-soluble carboxylate-containing polymer, whether a biopolymer or a synthetic polymer, has utility in the gelation solutions of the present invention. Water-soluble carboxylate-containing biopolymers having utility herein include polysaccharides and modified polysaccharides. Exemplary biopolymers are xanthan gum, guar gum, succinoglycan, scleroglycan, polyvinylsaccharides, carboxymethylcellulose, o-carboxychitosans, hydroxyethylcellulose, hydroxypropylcellulose, modified starches, and chemically modified derivatives thereof.

Water-soluble carboxylate-containing synthetic polymers having utility herein are preferably acrylamide polymers. Acrylamide polymers are polymers having one or more acrylamide groups and include polyacrylamide (PA), partially hydrolyzed polyacrylamide (PHPA), as well as copolymers, terpolymers, and tetrapolymers of acrylamide. Exemplary copolymers include copolymers of acrylamide and acrylate, and copolymers with AMPS or vinylpyrrolidone. PA, as defined herein, has from about 0% to about 3% of its amide groups hydrolyzed. Although 0% hydrolyzed PA initially lacks any carboxylate groups, the PA generates carboxylate groups through autohydrolysys under the conditions of the present process, thereby satisfying the definition of carboxylate-containing polymers having utility within the scope of the present invention. PHPA has greater than about 3% of its amide groups hydrolyzed. The average molecular weight of an acrylamide polymer having utility herein is generally in a range between about 10,000 and about 50,000,000, preferably between about 150,000 and about 30,000,000, and most preferably between about 200,000 and about 25,000,000.

Crosslinking agents having utility in the present gelation solution are water-soluble crosslinking agent complexes containing one or more reactive transition metal cations and one or more organic carboxylate anions. The term "carboxylate anion" as used herein encompasses carboxylate anionic species including mono-carboxylate anions, such as acetate and propionate, polycarboxylate anions, such as malonate, and substituted derivatives of carboxylate anions, such as glycolate and lactate. The carboxylate anions are generally obtained from the corresponding acids or salts thereof. Preferred among the crosslinking agent complexes are those including one or more chromium(III) cations complexed with one or more carboxylate anions. An example of a preferred crosslinking agent is one or more chromium(III) cations complexed with one or more acetate anions, as taught in U.S. Pat. No. 4,683,949 which is incorporated herein by reference.

Delaying agents having utility in the gelation solution of the present invention are water-soluble salts of carboxylate anions. The carboxylate anion of the salt can be the same species as the carboxylate anion of the crosslinking agent or can be a different carboxylate species. Preferred delaying agents in the practice of the present invention are salts of acetate, lactate, malonate, and glycolate. Among the preferred delaying agents are acetate salts, such as ammonium acetate, potassium acetate, or sodium acetate. Of the preferred delaying agents, malonate has the highest degree of ligand strength toward transition metal cations and acetate the lowest with glycolate and lactate being of intermediate strength.

The aqueous solvent of the gelation solution is substantially any aqueous liquid capable of forming a solution with the selected polymer, crosslinking agent and delaying agent. The term "solution" as used herein, in addition to true solutions, is intended to broadly encompass dispersions, emulsions, or any other homogeneous mixture of the gelation solution components in the aqueous solvent. The solvent is preferably either a fresh water or a brine, such as sea water or a produced water from the subterranean formation. Produced water can be advantageous because of its low-cost availability and because it enables the practitioner to return the produced water to the formation, thereby eliminating disposal thereof.

The gelation solution is prepared by admixing all of the solution components, including the polymer, crosslinking agent, delaying agent and solvent, together at the surface to form a homogeneous injectable fluid. Surface admixing broadly encompasses batch mixing the components in bulk and subsequently injecting the resulting gelation solution into the well bore or mixing the components in-line near the well head and injecting the gelation solution into the well bore.

Although the order of mixing the solution components is not specific to the practice of the present invention, it is preferable to mix the delaying agent in solution with the polymer or crosslinking agent before contacting the crosslinking agent and polymer. Thus, for example, surface admixing is accomplished by combining the crosslinking agent and delaying agent in the selected aqueous solvent. Either agent can initially be in a solid or liquid state, although, as taught herein, the crosslinking agent is to be added to the gelation solution in the form of a chromium(III)/carboxylate complex, and the delaying agent is to be added to the gelation solution in the form of a carboxylate salt. Forms of the preferred chromium(III)/acetate complex crosslinking agent are solid $CrAc_3$, solid $CrAc_3 \cdot H_2O$, solid $Cr_3Ac_7(OH)_2$ or a solution labeled "Chromic Acetate 50% Solution" that is commercially available, for example, from McGean Chemical Co., Inc., 1250 Terminal Tower, Cleveland, Ohio 44113, U.S.A. Upon combining the crosslinking and delaying agents in solution, the resulting solution is mixed with the polymer in a solid or liquid state to obtain the gelation solution.

It is further apparent that other mixing sequences are possible and fall within the scope of the present invention. For example, the delaying agent can be added to the polymer followed by addition of the crosslinking agent. Alternatively, the crosslinking agent can be added to the polymer followed by addition of the delaying agent. In any of the above-recited sequences, the solute components can be mixed dry, subsequently adding the aqueous solvent thereto, or the solute components can be mixed while in solution with the aqueous solvent.

The polymer concentration of the resulting gelation solution is generally at least about 300 ppm, preferably at least about 1,500 ppm, and most preferably within a range between about 2,000 ppm and about 100,000 ppm. The chromium(III) cation concentration in solution is generally between about 10 ppm and about 20,000 ppm, and preferably between about 20 ppm and about 4,000 ppm. The crosslinking agent and delaying agent are present in amounts such that the molar ratio of total carboxylate anions from both the crosslinking agent and delaying agent to chromium(III) cations in the gelation solution is preferably between about 0.5:1 and 100:1, more preferably between about 3:1 and 30:1, and most preferably greater than 3:1.

The gelation solution of the present invention has utility in substantially any permeability-reduction treatment related to hydrocarbon recovery. Permeability-reduction treatments can be alternatively termed fluid flow capacity-reduction treatments, and include conformance improvement treatments, coning treatments, fluid shutoff treatments, and squeeze cement treatments.

In the practice of a conformance improvement treatment, the gelation solution is injected into a well bore penetrating the subterranean hydrocarbon-bearing formation. Although, the well bore can be either an injection or a production well bore, it is often an injection well bore in conformance improvement treatment applications. The gelation solution is displaced from the well bore into the desired treatment region that is often a zone (also termed a horizontal stratum) containing higher permeability matrix proximate to the lower permeability hydrocarbon producing zone. The treatment region can alternatively be a high permeability anomaly, such as fractures, in the hydrocarbon producing zone or a zone proximate thereto. The crosslinking agent of the gelation solution effectuates crosslinking between appropriate sites of the same or other polymer molecules to create the network structure of the gel. The terms "crosslinking", "gelling" and "gelation" are used synonymously herein.

Partial crosslinking of the polymer by the crosslinking agent may occur in the gelation solution before the solution reaches the treatment region, but complete crosslinking resulting in gel formation is delayed in accordance with the present invention by means of the delaying agent until at least a substantial portion of the gelation solution is in place in the treatment region. Although the present invention is not dependent on any specific mechanism, it is believed that the crosslinking or gelation reaction requires a rate-controlling activation step that is impeded by the delaying agent.

The activation step of the crosslinking reaction is believed to require disassociation of a carboxylate anion from the crosslinking agent complex followed by exchange of a carboxylate anion of the acrylamide polymer. The activation step is avoided, however, by exchanging carboxylate anions of the crosslinking agent complex for carboxylate anions of the delaying agent rather than the polymer. Therefore, the rate of polymer gelation is advantageously retarded by selecting a carboxylate anion of the delaying agent having a higher ligand strength toward the transition metal cation relative to the ligand strength of the carboxylate anion of the crosslinking agent or the initial carboxylate groups of the polymer. This situation favors the exchange of carboxylate anions from the delaying agent into the crosslinking agent complex rather than from the polymer into the crosslinking agent complex. Alternatively, the polymer gelation rate is retarded by increasing the number of excess carboxylate anions of the delaying agent in the gelation solution which likewise favors the exchange of carboxylate anions from the delaying agent into the crosslinking agent complex.

In summary, the gelation rate is retarded to a greater degree as the number of carboxylate anions from the delaying agent in the gelation solution is increased relative to the number of chromium(III) cations in the gelation solution for a given species of carboxylate anion of the delaying agent. Conversely, the gelation rate is retarded to a lesser degree as the number of carboxylate anions from the delaying agent in the solution is decreased relative to the number of chromium(III) cations. Thus, the gelation rate and correspondingly the gel time of the solution can be controlled by adjusting the concentration of a given delaying agent relative to the concentration of a given crosslinking agent in the gelation solution.

At a fixed ratio of carboxylate anions of the delaying agent to chromium(III) cations in the gelation solution, the gelation rate is retarded to a greater degree, if a carboxylate anion of the delaying agent is selected having a higher ligand strength toward chromium(III) cation. Conversely, the gelation rate is retarded to a lesser degree, if a carboxylate anion of the delaying agent is selected having a lower ligand strength. Thus, the gelation rate and correspondingly the gel time of the solution can likewise be controlled by selecting the carboxylate anion species of the delaying agent as a function of its ligand strength toward the transition metal cation. Generally, it is desirable to retard the gelation rate of the gelation solution to a greater degree when the treatment region for gel placement is a substantial distance from the well bore or the temperature of the treatment region is relatively high.

Other treatment region conditions can also influence the selection of a specific composition for the gelation solution. In general, placement of a gel in less permeable matrix preferentially dictates selection of a gel having relatively limited structure. The degree of structure of the gel formulated in the manner of the present invention is inter alia a function of the polymer properties, the polymer concentration, and the degree and character of crosslinking in the gelation solution.

In general, the degree of structure of a gel containing an acrylamide polymer is increased by increasing the polymer or the crosslinking agent concentration of the gelation solution. However, a more cost-effective and oftentimes preferred means for achieving the same effect is to employ a higher molecular weight polymer at a relatively fixed concentration and initial hydrolysis level. Conversely, a reduction in the degree of structure is achieved by using a lower molecular weight polymer. Thus, the skilled practitioner can modify the degree of structure of the present gel in the above-described manner to correspond with the permeability of the treatment region.

In any case, complete crosslinking is achieved when either substantially all of the crosslinking agent or substantially all of the polymer crosslinking sites are consumed in the crosslinking reaction as the gelation solution is aged. Prior to complete crosslinking, the gelation solution is deemed flowing to the extent it is readily displacable from the well bore and through the formation. After complete crosslinking, the gelation solution is fully transformed to a gel that is at least more resistant to flow than the gelation solution and in many cases is non-flowing to the extent it has sufficient strength to resist propagation from the treatment region during subsequent normal hydrocarbon recovery operations.

Upon complete crosslinking, or complete gelation as it is alternatively termed, a sufficient volume of the newly-formed gel resides in place within the treatment region to reduce the permeability thereof. Consequently, hydrocarbon recovery fluids subsequently injected into the formation more uniformly sweep the untreated hydrocarbon producing zone in preference over the treatment region. It is additionally noted that the gel produced in accordance with the present invention retains its stability when contacted by liquid hydrocarbons within the formation and has a relatively high structural strength. Furthermore, flowing gels produced hereby typically exhibit relatively low mobilities for flow, while non-flowing gels produced hereby typically exhibit a yield pressure greater than injection or production pressures that are commonly encountered during oil production, thereby enabling the gel to remain in place throughout the production life of the subterranean hydrocarbon-bearing formation. The "yield pressure" is defined herein as the maximum pressure that can be applied to the gel in a given geometry having an orifice before the gel experiences structural failure and extrudes from the orifice.

In the practice of a coning treatment, a fluid shutoff treatment, or a squeeze cement treatment, the above-described gelation solution parameters are selected in a manner readily apparent to one skilled in the art to produce a gel satisfying the specific demands of the treatment. For example, squeeze cement treatments are often used to shut off formation zones in fluid communication with the well bore, in a manner requiring greater gel strength than many conformance improvement treatments. Therefore, gels prepared for squeeze cement treatments typically have a substantially greater structural strength and a higher yield pressure than gels prepared for conformance improvement treatments. Placement of the gelation solution for squeeze cement treatments, fluid shutoff treatments, and coning treatments, however, like conformance improvement treatments, comprises substantially the same steps of injecting the gelation solution into a well bore and displacing the solution into the treatment region where the gel is formed in situ.

Treatment regions in the formation within the scope of the present invention as applied to squeeze cement treatments include the near well bore, well bore tubing and casing, and well bore annuli. Treatment regions in the formation within the scope of the present invention as applied to coning treatments include matrix and anomalies such as those that provide fluid communication between a well bore and an aquifer or between a well bore and a gas cap.

The following examples demonstrate the practice and utility of the present invention, but are not to be construed as limiting the scope thereof.

EXAMPLES

In examples 1-11, samples of gelation solutions are prepared by adding a delaying agent to 30 cm$^3$ of an aqueous polymer stock solution. A crosslinking agent solution is then added to form the gelation solution. The active concentration of the crosslinking agent solution is 50% by weight. The polymer is polyacrylamide (PA) having a molecular weight of about 500,000 and initially having about 2.8 mole % of its amide groups hydrolyzed. The crosslinking agent is a chromium(III) triacetate complex, and the solvent is fresh tap water. No pH adjustment is performed during preparation of the samples. The delaying agent composition and other experimental conditions, however, are varied among the examples.

The samples are gelled by placing them in individual thick-walled glass ampules. The ampules have an inside diameter of 2.4 cm and an internal height of about 12 cm. Free oxygen is removed from the samples and the ampule interiors prior to sealing the ampules under vacuum with a glass blowing torch. The sealed ampules are placed in an airbath at preselected temperatures and the samples are aged for preselected periods of time to form gels. While the samples are aging, the ampules are periodically inverted and the strength of the gels are observed as a function of time in accordance with the following gel strength code.

| Gel Strength Code | |
|---|---|
| Code* Letter | Gel Strength Characterization |
| A | No detectable gel formed. The gel appears to have the same viscosity (fluidity) as the original polymer solution and no gel can be visually detected. |
| B | High flowing gel. The gel appears to be only slightly more viscous than the initial relatively low-viscosity polymer solution. |
| C | Flowing gel. Most of the obviously detectable gel flows to the bottom upon inversion. |
| D | Moderately flowing gel. A small portion (about 5 to 15%) of the gel does not readily flow to the bottom upon inversion - usually characterized as a "tonguing" gel. |

-continued

Gel Strength Code

| Code* Letter | Gel Strength Characterization |
|---|---|
| E | Barely flowing gel. The gel slowly flows to the bottom and/or a significant portion (>15%) of the gel does not flow to the bottom upon inversion. |
| F | Highly deformable nonflowing gel. The gel does not flow to the bottom upon inversion (gel flows to just short of reaching the bottom). |
| G | Moderately deformable nonflowing gel. The gel flows about halfway down to the bottom upon inversion. |
| H | Slightly deformable nonflowing gel. The gel surface only slightly deforms upon inversion. |
| I | Rigid gel. There is no gel-surface deformation upon inversion. |
| S | Syneresis - expulsion of a water phase. |

*"+" or "−" are symbols that may be associated with a code letter to denote shades of gel strength characterization.

The experimental variables and the results for each example are set forth below.

EXAMPLE 1

Samples of gelation solutions are prepared in the above-described manner. The active polymer concentration of polymer stock solution used in each sample is 5.0% by weight. The crosslinking agent concentration of each sample excluding the delaying agent is 6200 ppm. The weight ratio of polymer to chromium(III) cation of each sample is 35.2:1. The chromium(III) concentration of each sample excluding the delaying agent is 1410 ppm. The delaying agent is added as an aqueous solution of sodium lactate at a concentration of 60% by weight. The samples are gelled at a temperature of 70° C. The gel strengths for each sample are set forth below in Table 1 as a function of time.

TABLE 1

| Sample No. | 1 | 2 | 3 | 4 | 5 | 6 |
|---|---|---|---|---|---|---|
| Mole Ratio Delaying Agent: Cr(III) | 0:1 | 5.0:1 | 6.0:1 | 7.0:1 | 8.0:1 | 10.0:1 |
| ppm Delaying Agent (wt/fixed wt) | 0 | 15,200 | 18,200 | 21,300 | 24,300 | 30,400 |
| Aging Time (hrs) | | | Gel Strength Cods | | | |
| 0.5 | A | A | A | A | A | A |
| 1.0 | H | A | A | A | A | A |
| 1.5 | I | A | A | A | A | A |
| 2.0 | I | C+ | C− | A | A | A |
| 2.5 | I | H | G | E | A | A |
| 3.0 | I | H+ | G+ | E+ | A | A |
| 4.0 | I | I | I | G− | C− | A |
| 6.0 | I | I | I | G+ | C− | A |
| 8.0 | I | I | I | H− | C− | A |
| 11 | I | I | I | H− | C− | A |
| 24 | I | I | I | I− | C− | A |
| 48 | I | I | I | I | D− | A |
| 72 | I | I | I | I | D | A |
| 96 | I | I | I | I | G+ | A |
| 120 | I | I | I | I | I | A |
| 168 | I | I | I | I | I | E |
| 300 | I | I | I | I | I | I |
| 2100 | I | I | I | I | I | I |

EXAMPLE 2

Samples of gelation solutions are prepared in the above-described manner. The active polymer concentration of polymer stock solution used in each sample is 5.0% by weight. The crosslinking agent concentration of each sample excluding the delaying agent is 6210 ppm. The weight ratio of polymer to chromium(III) cation of each sample is 35.2:1. The chromium(III) concentration of each sample excluding the delaying agent is 1410 ppm. The delaying agent is added as an aqueous solution of sodium lactate at a concentration of 60% by weight. The samples are gelled at a temperature of 88° C. The gel strengths for each sample are set forth below in Table 2 as a function of time.

TABLE 2

| Sample No. | 1 | 2 | 3 | 4 | 5 | 6 |
|---|---|---|---|---|---|---|
| Mole Ratio Delaying Agent: Cr(III) | 0:1 | 4.0:1 | 6.0:1 | 8.0:1 | 10.0:1 | 13.0:1 |
| ppm Delaying Agent (wt/fixed wt) | 0 | 12,100 | 18,100 | 24,200 | 30,300 | 39,400 |
| Aging Time (hrs) | | | Gel Strength Cods | | | |
| 0.5 | C | A+ | A+ | A | A | A |
| 1.0 | I− | A | A | A | A | A |
| 1.5 | I | G | A | A | A | A |
| 2.0 | I | I | F | A | A | A |
| 2.5 | I | I | I− | C+ | A | A |
| 3.0 | I | I | I | D− | A | A |
| 4.0 | I | I | I | D− | A | A |
| 6.0 | I | I | I | E | A | A |
| 8.0 | I | I | I | F+ | C− | A |
| 24 | I | I | I | I | C+ | A |
| 30 | I | I | I | I | D− | A |
| 48 | I | I | I | I | H | A |
| 72 | I | I | I | I | I | E+ |
| 96 | I | I | I | I | I | H |
| 168 | I | I | I | I | I | I |
| 2600 | I | I | I | I | I | I |

EXAMPLE 3

Samples of gelation solutions are prepared in the above-described manner. The active polymer concentration of polymer stock solution used in each sample is 6.0% by weight. The crosslinking agent concentration of each sample excluding the delaying agent is 11,800 ppm. The weight ratio of polymer to chromium(III) cation of each sample is 22.0:1. The chromium(III) concentration of each sample excluding the delaying agent is 1410 ppm. The delaying agent is added as an aqueous solution of sodium lactate at a concentration of 60% by weight. The samples are gelled at a temperature of 104° C. The gel strengths for each sample are set forth below in Table 3 as a function of time.

TABLE 3

| Sample No. | 1 | 2 | 3 | 4 | 5 |
|---|---|---|---|---|---|
| Mole Ratio Delaying Agent: Cr(III) | 0:1 | 5.0:1 | 8.0:1 | 11.0:1 | 14.0:1 |
| ppm Delaying Agent (wt/fixed wt) | 0 | 28,800 | 46,100 | 63,400 | 80,700 |
| Aging Time (hrs) | | | Gel Strength Cods | | |
| 0.5 | A | A | A | A | A |
| 1.0 | I | C | A | A | A |
| 2.0 | I | F | A | A | A |
| 3.0 | I | I | A | A | A |
| 4.0 | I | I | A | A | A |
| 5.0 | I | I | C | A | A |
| 6.0 | I | I | D | A | A |
| 8.0 | I | I | I | A | A |
| 11 | I | I | I | B− | A |
| 24 | I | I | I | I | A |
| 48 | I | I | I | I | G |
| 72 | I | I | I | I | I |
| 1000 | I | I | I | I | I |

EXAMPLE 4

Samples of gelation solutions are prepared in the above-described manner. The active polymer concentration of polymer stock solution used in each sample is 5.0% by weight. The crosslinking agent concentration of each sample excluding the delaying agent is 9860 ppm. The weight ratio of polymer to chromium(III) cation of each sample is 22.1:1. The chromium(III) concentration of each sample excluding the delaying agent is 2240 ppm. The delaying agent is added as an aqueous solution of sodium lactate at a concentration of 60% by weight. The samples are gelled at a temperature of 124° C. The gel strengths for each sample are set forth below in Table 4 as a function of time.

TABLE 4

| Sample Nos. | 1 | 2 | 3 | 4 | 5 |
|---|---|---|---|---|---|
| Mole Ratio Delaying Agent: CrIII | 0:1 | 6.0:1 | 9.0:1 | 12.0:1 | 18.0:1 |
| ppm Delaying Agent (wt/fixed wt) | 0 | 28,900 | 43,400 | 57,900 | 86,800 |
| Aging Time (hrs) | | | Gel Strength Code | | |
| 0.5 | I | A | A | A | A |
| 1.0 | I | A | A | A | A |
| 1.5 | I | C− | A | A | A |
| 2.0 | I | C+ | A | A | A |
| 3.0 | I | D− | A | A | A |
| 4.0 | I | I | A | A | A |
| 6.0 | I | I | A | A | A |
| 8.0 | I | I | E | A | A |
| 11 | I | I | I | A | A |
| 24 | I | I | I | I | E |
| 30 | I | I | I | I | I |
| 300 | I | I | I | I | I |

The data of Tables 1–4 show the gelation rate retarding effect achieved by means of the sodium lactate delaying agent across a range of temperatures. The data further show that the degree of gelation rate retardation is a function of the lactate anion concentration at a fixed chromium(III) cation concentration. Accordingly, the degree of gelation rate retardation is controlled by varying the mole ratio of the lactate anion to chromium(III) cation.

EXAMPLE 5

Samples of gelation solutions are prepared in the above-described manner. The active polymer concentration of polymer stock solution used in each sample is 5.0% by weight. The delaying agent is added as an aqueous solution of sodium lactate at a concentration of 60% by weight. The samples are gelled at a temperature of 104° C. The gel strengths for each sample are set forth below in Table 5 as a function of time.

TABLE 5

| Sample Nos. | 1 | 2 |
|---|---|---|
| ppm Crosslinking Agent in Gel (excluding delaying agent) | 6190 | 11,800 |
| wt ratio polymer: Cr(III) | 35.2:1 | 22.0:1 |
| ppm Cr(III) (exculding delaying agent) | 1410 | 2680 |
| Mole Ratio Delaying Agent: Cr(III) | 8.0:1 | 8.0:1 |
| ppm Delaying Agent (wt/fixed Aging Time (hrs) | 24,200 | 46,100 |
| 1.0 | A | A |
| 2.0 | A | A |
| 3.0 | C+ | A |
| 4.0 | D | A |
| 5.0 | I | C |
| 6.0 | I | D |
| 7.0 | I | I |
| 1200 | I | I |

The data of Table 5 shows the gelation rate retarding effect achieved by means of the sodium lactate delaying agent across a range of chromium(III) cation concentrations. The data further show that as both the chromium(III) cation and lactate anion concentrations are increased at a fixed mole ratio of the lactate anion to chromium(III) cation, the effect of increasing lactate anion concentration on gelation rate dominates over the effect of increasing chromium(III) cation concentration, thereby effectively retarding the gelation rate.

EXAMPLE 6

Samples of gelation solutions are prepared in the above-described manner. The active polymer concentration of polymer stock solution used in each sample is 6.0% by weight. The crosslinking agent concentration of each sample excluding the delaying agent is 19,400 ppm. The weight ratio of polymer to chromium(III) cation of each sample is 13.2:1. The chromium(III) concentration of each sample excluding the delaying agent is 4400 ppm. The delaying agent is added as an aqueous solution of sodium lactate at a concentration of 60% by weight. The samples are gelled at a temperature of 124° C. The gel strengths for each sample are set forth below in Table 6 as a function of time.

TABLE 6

| Sample Nos. | 1 | 2 | 3 | 4 | 5 |
|---|---|---|---|---|---|
| Mole Ratio Delaying Agent: Cr(III) | 0:1 | 5.0:1 | 10.0:1 | 15.0:1 | 20.0:1 |
| ppm Delaying Agent (wt/fixed wt) | 0 | 47,500 | 95,000 | 142,000 | 190,000 |
| Aging Time (hrs) | | | Gel Strength Code | | |
| 0.5 | I | A | A | A | A |
| 1.0 | I | C− | A | A | A |
| 2.0 | I | D+ | A | A | A |
| 3.0 | I | E | A | A | A |
| 4.0 | I | I | A | A | A |
| 6.0 | I | I | A | A | A |
| 8.0 | I* | I | C | A | A |
| 1 | | I | G | A | A |
| 24 | | I | I | D | A |
| 32 | | I | I | I | A |
| 48 | | I | I | I | C |
| 72 | | I | I | I | I |
| 600 | | I | I | I | I |

*Experiment terminated for this sample.

EXAMPLE 7

Samples of gelation solutions are prepared in the above-described manner. The active polymer concentration of polymer stock solution used in each sample is 6.0% by weight. The crosslinking agent concentration of each sample excluding the delaying agent is 19,400 ppm. The weight ratio of polymer to chromium(III)

cation of each sample is 13.2:1. The chromium(III) concentration of each sample excluding the delaying agent is 4400 ppm. The delaying agent is added as an aqueous solution of lactic acid at a concentration of 60% by weight. The samples are gelled at a temperature of 124° C. The gel strengths for each sample are set forth below in Table 7 as a function of time.

TABLE 7

| Sample No. | 1 | 2 | 3 | 4 | 5 |
|---|---|---|---|---|---|
| Mole Ratio Delaying Agent: Cr(III) | 0:1 | 5.0:1 | 10.0:1 | 15.0:1 | 20.0:1 |
| ppm Delaying Agent (wt/fixed wt) | 0 | 38,200 | 76,300 | 115,000 | 153,000 |
| Aging Time (hrs) | | | Gel Strength Code | | |
| 0.5 | I | | | | |
| 1.0 | I | C− | A+ | A+ | A |
| 2.0 | I | I | C | C | A |
| 3.0 | I | I | D− | C | A |
| 4.0 | I | I | I | F+ | A |
| 5.0 | I | I | I | I− | D |
| 6.0 | I | I | I | I | I |
| 7.0 | I* | I | I | I | I |
| 24 | | S* | S* | S−* | I |
| 48 | | | | | I |
| 72 | | | | | S |

*Experiment terminated for this sample.

The data of Tables 6 and 7 compare the gelation rate retarding effect of the sodium lactate delaying agent as taught by the present invention versus the retarding effect of the lactic acid delaying agent as taught by the prior art. Sodium lactate is shown to be a more effective delaying agent than lactic acid at a fixed mole ratio of lactate anion to chromium(III) cation. Gels formulated with sodium lactate also exhibit better long term stability and performance as compared to gels formed with lactic acid.

EXAMPLE 8

Samples of gelation solutions are prepared in the above-described manner. The active polymer concentration of polymer stock solutin used in each sample is 6.0% by weight. The crosslinking agent concentration of each sample excluding the delaying agent is 6190 ppm. The weight ratio of polymer to chromium(III) cation of each sample is 35.2:1. The chromium(III) concentration of each sample excluding the delaying agent is 1410 ppm. The delaying agent is added as solid sodium glycolate. The samples are gelled at a temperature of 60° C. The gel strengths for each sample are set forth below in Table 8 as a function of time.

TABLE 8

| Sample No. | 1 | 2 | 3 | 4 | 5 | 6 |
|---|---|---|---|---|---|---|
| Mole Ratio Delaying Agent: Cr(III) | 0:1 | 0.60:1 | 1.2:1 | 2.4:1 | 4.8:1 | 9.7:1 |
| ppm Delaying Agent (wt/fixed wt) | 0 | 1,600 | 3,200 | 6,400 | 12,800 | 25,600 |
| Aging Time (hrs) | | | Gel Strength Code | | | |
| 1.0 | A | A | A | A | A | A |
| 2.0 | D− | A | A | A | A | A |
| 2.5 | E | D− | A | A | A | A |
| 3.0 | H | E+ | D | C+ | A | A |
| 4.0 | I | I− | G− | D− | A | A |
| 6.0 | I | I | I | G | A | A |
| 8.0 | I | I | I | H+ | B− | A |
| 24 | I | I | I | H+ | D | A |

TABLE 8-continued

| Sample No. | 1 | 2 | 3 | 4 | 5 | 6 |
|---|---|---|---|---|---|---|
| 48 | I | I | I | I− | D | A |
| 72 | I | I | I | I | E | A |
| 216 | I | I | I | I | F− | A |
| 300 | I | I | I | I | F | A |
| 600 | I | I | I | I | I | I |
| 3200 | I | I | I | I | I | I |

EXAMPLE 9

Samples of gelation solutions are prepared in the above-described manner. The active polymer concentration of polymer stock solution used in each sample is 5.0% by weight. The crosslinking agent concentration of each sample excluding the delaying agent is 6190 ppm. The weight ratio of polymer to chromium(III) cation of each sample is 35.2:1. The chromium(III) concentration of each sample excluding the delaying agent is 1410 ppm. The delaying agent added as solid sodium glycolate. The samples are gelled at a temperature of 70° C. The gel strengths for each sample are set forth below in Table 9 as a function of time.

TABLE 9

| Sample No. | 1 | 2 | 3 | 4 | 5 |
|---|---|---|---|---|---|
| Mole Ratio Delaying Agent: Cr(III) | 0:1 | 0.60:1 | 8.0:1 | 10.0:1 | 12.0:1 |
| ppm Delaying Agent (wt/fixed wt) | 0 | 16,000 | 21,300 | 26,600 | 32,000 |
| Aging Time (hrs) | | | Gel Strength Code | | |
| 0.5 | C+ | A | A | A | A |
| 1.0 | I | C− | A | A | A |
| 1.5 | I | D | C | B+ | A |
| 2.0 | I | I− | D− | B+ | A |
| 4.0 | I | I | E | C− | A |
| 6.0 | I | I | G | C | A |
| 8.0 | I | I | G+ | C | A |
| 24 | I | I | I | D | A |
| 48 | I | I | I | E+ | C− |
| 96 | I | I | I | F+ | C+ |
| 120 | I | I | I | G+ | D− |
| 144 | I | I | I | I | D− |
| 300 | I | I | I | I | H |
| 408 | I | I | I | I | I |
| 2400 | I | I | I | I | I |

EXAMPLE 10

Samples of gelation solutions are prepared in the above-described manner. The active polymer concentration of polymer stock solution used in each sample is 5.0% by weight. The crosslinking agent concentration of each sample excluding the delaying agent is 6190 ppm. The weight ratio of polymer to chromium(III) cation of each sample is 35.2:1. The chromium(III) concentration of each sample excluding the delaying agent is 1410 ppm. The delaying agent is added as solid sodium glycolate. The samples are gelled at a temperature of 88° C. The gel strengths for each sample are set forth below in Table 10 as a function of time.

TABLE 10

| Sample No. | 1 | 2 | 3 | 4 |
|---|---|---|---|---|
| Mole Ratio Delaying Agent Cr(III) | 0:1 | 6.0:1 | 8.0:1 | 10.0:1 |
| ppm Delaying Agent | 0 | 15,900 | 21,200 | 26,500 |

TABLE 10-continued

| Sample No. | 1 | 2 | 3 | 4 |
|---|---|---|---|---|
| (wt/fixed wt) Aging Time (hrs) | | Gel Strength Code | | |
| 0.5 | A | A | A | A |
| 1.0 | I | H− | A | A |
| 1.5 | I | H+ | D− | A |
| 2.0 | I | I− | D+ | A |
| 3.0 | I | I | G+ | C− |
| 4.0 | I | I | G+ | C+ |
| 6.0 | I | I | H+ | D− |
| 8.0 | I | I | I | D |
| 11 | I | I | I | E |
| 24 | I | I | I | G+ |
| 48 | I | I | I | I |
| 1800 | I | I | I | H+ |
| 2500 | I | I | I | H+ |

The data of Tables 8–10 show the gelation rate retarding effect achieved by means of the sodium glycolate delaying agent across a range of temperatures. The data further show that, similar to the lactate anion, the degree of gelation rate retardation is a function of the glycolate anion concentration at a fixed chromium(III) cation concentration. Accordingly, the degree of gelation rate retardation is controlled by varying the mole ratio of the glycolate anion to chromium(III) cation.

EXAMPLE 11

Samples of gelation solutions are prepared in the above-described manner. The active polymer concentration of polymer stock solution used in each sample is 5.0% by weight. The active polymer concentration of each sample excluding the delaying agent is 48,200 ppm. The weight ratio of polymer to chromium(III) cation of each sample is 8.81:1. The chromium(III) concentration of each sample excluding the delaying agent is 5470 ppm. The delaying agent is added as solid sodium malonate. The samples are gelled at a temperature of 124° C. The gel strengths for each sample are set forth below in Table 11 as a function of time.

TABLE 11

| Sample No. | 1 | 2 | 3 | 4 | 5 |
|---|---|---|---|---|---|
| Mole Ratio Delaying Agent: CrIII | 0:1 | 3.0:1 | 4.0:1 | 6.0:1 | 9.0:1 |
| ppm Delaying Agent | 0 | 52,400 | 68,000 | 105,000 | 157,000 |
| (wt/fixed wt) Aging Time (hrs) | | | Gel Strength Code | | |
| 1.0 | I | A | A | A | A |
| 2.0 | I | A | A | A | A |
| 4.0 | I | A | A | A | A |
| 8.0 | I | A | A | A | A |
| 24 | I | A | A | A | A |
| 32 | I | D | A | A | A |
| 48 | I | I | A | A | A |
| 168 | I | I | A | A | A |
| 240 | I | I | I | A | A |
| 380 | I | I | I | C | A* |
| 420 | I | I | I | G | |
| 600 | I | I | I | I | |
| 2500 | I | I | I | I | |

*Experiment terminated for this sample.

The data of Table 11 show the exceptional gelation rate retarding effect achieved by means of the sodium malonate delaying agent at an elevated temperature. The data further show that, similar to the lactate and glycolate anions, the degree of gelation rate retardation is controlled by varying the mole ratio of the malonate anion to chromium(III) cation.

EXAMPLE 12

Two samples of gelation solutions are prepared in Example 12 by adding a delaying agent solution to an aqueous polymer solution. A crosslinking agent solution is then added to form the gelation solution. The polymer is polyacrylamide (PA) having a molecular weight of about 500,000, and concentration of the polymer in the polymer stock solution is 5.0% by weight. The crosslinking agent is chromium(III) triacetate, and the solvent is fresh tap water. The weight ratio of polymer to chromium(III) is 35.2:1. The delaying agent of the first sample is sodium lactate and the delaying agent of the second sample is lactic acid. The mole ratio of sodium lactate or lactic acid to chromium(III) is 6:1. A third sample of a gelation solution is prepared as a control sample in substantially the same manner as the first two samples, but without a delaying agent.

All three samples are separately gelled in a Rheometrics pressure rheometer at a pressure of 2070 kPa and a temperature of 88° C. The dynamic oscillatory conditions are 0.1 rad/sec (about 0.1 sec$^{-1}$ shear rate) and 10% strain. The dynamic oscillatory viscosity is measured as a function of time for each sample. It is noted that the rate of dynamic oscillatory viscosity increase with time is proportional to the gelation rate and that the final equilibrium viscosity is a measure of the elastic strength of the gel. It is further noted that the viscosities of the present samples are dominated by the elastic component, while the shear component is nearly negligible. The results shown in FIG. 1 indicate that both the sodium lactate delaying agent and the lactic acid delaying agent substantially retard the rate of gelation in the gelation solution when compared to the gelation control solution containing no delaying agent. The results further show that under these conditions sodium lactate is much more effective than lactic acid in retarding the gelation rate.

While the foregoing preferred embodiments of the invention have been described and shown, it is understood that alternatives and modifications, such as those suggested and others, may be made thereto and fall within the scope of the present invention.

I claim:

1. A process for substantially reducing the permeability of a treatment region in a hydrocarbon-bearing formation below an earthen surface penetrated by a well bore, the process comprising:
   a) mixing at an earthen surface a gelation solution consisting essentially of;
      i) a water-soluble crosslinkable polymer,
      ii) a chromium(III) complex having one or more chromium(III) cations and one or more carboxylate anions selected from the group consisting of mono-carboxylates, poly-carboxylates, substituted derivatives of mono- and poly- carboxylates, and mixtures thereof,
      iii) a salt having one or more carboxylate anions selected from the group consisting of mono-carboxylates, poly-carboxylates, and substituted derivatives of mono- and poly- carboxylates capable of retarding the gelation rate of said gelation solution, and
      iv) an aqueous solvent, b) injecting said gelation solution into a well bore in fluid communication with a subterranean hydrocarbon-bearing formation;

c) displacing said gelation solution into a treatment region of said formation; and d) gelling said gelation solution at a sufficiently retarded gelation rate to enable said gelation solution to reach said treatment region before complete gelation, thereby producing a gel that substantially reduces the permeability of said treatment region.

2. The process of claim 1 wherein the molar ratio of said one or more carboxylate anions of said complex and said one or more carboxylate anions of said salt to said chromium(III) cations in said gelation solution is between about 0.5:1 and about 100:1.

3. The process of claim 1 wherein the molar ratio of said one or more carboxylate anions of said complex and said one or more carboxylate anions of said salt to said chromium(III) cations in said gelation solution is greater than 3:1.

4. The process of claim 1 further comprising retarding said gelation rate of said gelation solution to a greater degree by increasing the concentration of said salt in said gelation solution relative to the concentration of said chromium(III) complex.

5. The process of claim 1 further comprising retarding said gelation rate of said gelation solution to a greater degree by preselecting said one or more carboxylate anions of said salt having a higher ligand strength or retarding said gelation rate of said gelation solution to a lesser degree by preselecting said one or more carboxylate anions of said salt having a lower ligand strength.

6. The process of claim 1 wherein said one or more carboxylate anions of said salt is acetate.

7. The process of claim 1 wherein said one or more carboxylate anions of said salt is lactate.

8. The process of claim 1 wherein said one or more carboxylate anions of said salt is selected from the group consisting of acetate, lactate, glycolate, malonate, and mixtures thereof.

9. The process of claim 1 wherein said process is a conformance improvement treatment.

10. The process of claim 1 wherein said process is a squeeze cement treatment.

11. The process of claim 1 wherein said process is a coning treatment.

12. The process of claim 1 wherein said process is a fluid shutoff treatment.

13. The process of claim 1 wherein the molar ratio of said carboxylate anions of said salt to said chromium (III) cations is at least about 5:1.

14. The process of claim 1 wherein said subterranean, hydrocarbon-bearing formation has a temperature of at least about 70° C.

15. A process for substantially reducing the permeability of a treatment region in a hydrocarbon-bearing formation below an earthen surface penetrated by a well bore, the process comprising:

a) mixing at an earthen surface a gelation solution consisting essentially of;
  i) a water-soluble crosslinkable polymer,
  ii) a chromium(III) complex having one or more chromium(III) cations and one or more acetate anions,
  iii) a salt having one or more carboxylate anions selected from the group consisting of mono-carboxylates, poly-carboxylates, and substituted derivatives of mono- and poly- carboxylates capable of retarding the gelation rate of said gelation solution, and
  iv) an aqueous solvent;

b) injecting said gelation solution into a well bore in fluid communication with a subterranean hydrocarbon-bearing formation;

c) displacing said gelation solution into a treatment region of said formation; and d) gelling said gelation solution at a sufficiently retarded gelation rate to enable said gelation solution to reach said treatment region before complete gelation, thereby producing a gel that substantially reduces the permeability of said treatment region.

16. The process of claim 15 wherein the molar ratio of said one or more acetate anions of said complex and said one or more carboxylate anions of said salt to said chromium(III) cations in said gelation solution is between about 0.5:1 and about 100:1.

17. The process of claim 15 wherein the molar ratio of said one or more acetate anions of said complex and said one or more carboxylate anions of said salt to said chromium(III) cations in said gelation solution is greater than 3:1.

18. The process of claim 15 wherein said one or more carboxylate anions of said salt is acetate.

19. The process of claim 15 wherein said one or more carboxylate anions of said salt is lactate.

20. The process of claim 15 wherein said one or more carboxylate anions of said salt is selected from the group consisting of acetate, lactate, glycolate, malonate, and mixtures thereof.

21. The process of claim 15 wherein the molar ratio of said carboxylate anions of said salt to said chromium (III) cations is at least about 5:1.

22. The process of claim 15 wherein said subterranean, hydrocarbon-bearing formation has a temperature of at least about 70° C.

23. A process for substantially reducing the permeability of a treatment region in a hydrocarbon-bearing formation below an earthen surface penetrated by a well bore, the process comprising:

a) mixing a gelation solution at an earthen surface including;
  i) a water soluble, carboxylate-containing crosslinkable polymer having greater than about 0.1 mole % of amide groups thereof hydrolyzed,
  ii) a chromium(III) complex having one or more chromium(III) cations and one or more carboxylate anions selected from the group consisting of mono-carboxylates, poly-carboxylates, substituted derivatives of mono- and poly- carboxylates, and mixtures thereof,
  iii) a salt having one or more carboxylate anions selected from the group consisting of mono-carboxylates, poly-carboxylates, and substituted derivatives of mono- and poly- carboxylates capable of retarding the gelation rate of said gelation solution, and
  iv) an aqueous solvent;

b) injecting said gelation solution into a well bore in fluid communication with a subterranean hydrocarbon-bearing formation;

c) displacing said gelation solution into a treatment region of said formation; and d) gelling said gelation solution at a sufficiently retarded gelation rate to enable said gelation solution to reach said treatment region before complete gelation, thereby producing a gel that substantially reduces the permeability of said treatment region.

24. The process of claim 23 wherein the molar ratio of said one or more carboxylate anions of said complex and said one or more carboxylate anions of said salt to said chromium(III) cations in said gelation solution is between about 0.5:1 and about 100:1.

25. The process of claim 23 wherein the molar ratio of said one or more carboxylate anions of said complex and said one or more carboxylate anions of said salt to said chromium(III) cations in said gelation solution is greater than 3:1.

26. The process of claim 23 further comprising retarding said gelation rate of said gelation solution to a greater degree by increasing the concentration of said salt in said gelation solution relative to the concentration of said chromium(III) complex.

27. The process of claim 23 further comprising retarding said gelation rate of said gelation solution to a greater degree by preselecting said one or more carboxylate anions of said salt having a higher ligand strength or retarding said gelation rate of said gelation solution to a lesser degree by preselecting said one or more carboxylate anions of said salt having a lower ligand strength.

28. The process of claim 23 wherein said one or more carboxylate anions of said salt is acetate.

29. The process of claim 23 wherein said one or more carboxylate anions of said salt is lactate.

30. The process of claim 23 wherein said one or more carboxylate anions of said salt is selected from the group consisting of acetate, lactate, glycolate, malonate, and mixtures thereof.

31. The process of claim 23 wherein said process is a conformance improvement treatment.

32. The process of claim 23 wherein said process is a squeeze cement treatment.

33. The process of claim 23 wherein said process is a coning treatment.

34. The process of claim 23 wherein said process is a fluid shutoff treatment.

35. The process of claim 23 wherein the molar ratio of said carboxylate anions of said salt to said chromium (III) cations is greater than about 5:1.

36. The process of claim 23 wherein said polymer has at least about 2 mole % of the amide groups thereof hydrolyzed.

37. The process of claim 23 wherein said polymer has at least about 2.8 mole % of the amide groups thereof hydrolyzed.

38. The process of claim 23 wherein said subterranean, hydrocarbon-bearing formation has a temperature of at least about 70° C.

39. The process of claim 23 wherein said one or more carboxylate anions of said chromium (III) complex is acetate.

40. The process of claim 23 wherein said polymer is an acrylamide polymer.

41. A process for substantially reducing the permeability of a treatment region in a hydrocarbon-bearing formation below an earthen surface penetrated by a well bore, the process comprising:
 a) mixing at an earthen surface a gelation solution consisting essentially of:
  i) a water-soluble acrylamide polymer,
  ii) a chromium (III) complex having one or more chromium (III) cations and one or more acetate anions,
  iii) a salt having one or more lactate anions, and
  iv) an aqueous solvent;
 b) injecting said gelation solution into a well bore in fluid communication with a subterranean hydrocarbon-bearing formation;
 c) displacing said gelation solution into a treatment region of said formation; and
 d) gelling said gelation solution at a sufficiently retarded gelation rate to enable said gelation solution to reach said treatment region before complete gelation, thereby producing a gel that substantially reduces the permeability of said treatment region.

* * * * *

UNITED STATES PATENT AND TRADEMARK OFFICE
CERTIFICATE OF CORRECTION

PATENT NO. : 5,421,411
DATED : June 6, 1995
INVENTOR(S) : Robert D. Sydansk

It is certified that error appears in the above-indentified patent and that said Letters Patent is hereby corrected as shown below:

Col. 9, line 10:  Delete "inter alia" and insert --*inter alia*--.
Col. 14, line 4:  Delete "(wt/fixed" and insert --(wt/fixed wt)--.
Col. 14, line 54: Delete "1" and insert --11--.

Signed and Sealed this

Seventeenth Day of October, 1995

Attest:

BRUCE LEHMAN

Attesting Officer    Commissioner of Patents and Trademarks